United States Patent [19]

Laserson et al.

[11] Patent Number: 5,406,780
[45] Date of Patent: Apr. 18, 1995

[54] COMPLIANT ENGAGEMENT MEMBER FOR USE WITH TREE-SHAKING APPARATUS

[75] Inventors: Matti Laserson, Golden Beach, Fla.; Eitan Zehavi, Kiriat Tivon, Israel

[73] Assignees: Eitan Zahavi; Davin Chiel, both of Israel

[21] Appl. No.: 165,030

[22] Filed: Dec. 9, 1993

[51] Int. Cl.⁶ .......................................... A01D 46/26
[52] U.S. Cl. .................................................. 56/340.1
[58] Field of Search .................... 56/340.1, 2, DIG. 9, 56/DIG. 24

[56] References Cited

U.S. PATENT DOCUMENTS

| | | |
|---|---|---|
| 3,163,458 | 12/1964 | Brandt, Jr. . |
| 3,318,629 | 5/1967 | Brandt, Jr. . |
| 3,335,556 | 8/1967 | Edgemond, Jr. . |
| 3,338,040 | 8/1967 | Shipley, Jr. . |
| 3,479,806 | 11/1969 | Pool et al. . |
| 3,548,578 | 12/1970 | Shipley, Jr. . |
| 3,596,972 | 8/1971 | Pool . |
| 3,656,283 | 4/1972 | Shipley ........................ 56/1 |
| 3,762,139 | 10/1973 | Tompkins ................. 56/340.1 |
| 3,793,815 | 2/1974 | Hughes ..................... 56/340.1 |
| 4,521,468 | 6/1985 | Brandt ................... 56/340.1 X |
| 4,757,674 | 7/1988 | Compton ................. 56/340.1 |
| 4,921,073 | 5/1990 | Compton ............... 56/340.1 X |

Primary Examiner—George A. Suchfield
Attorney, Agent, or Firm—Cesari and McKenna

[57] ABSTRACT

A compliant engagement member for use with tree-shaking apparatus that resists deformation along the axis of vibration, thereby avoiding dissipation of vibrational energy, yet allows sufficient off-axis deformation to prevent slippage and consequent abrasion of the tree. The engagement member of the present invention preferably includes a rigid shaker pad; a sling that retains the shaker pad against the arm of a shaking device; a sealed, lubricant-filled pouch, extending from the sling; and a contact blanket, which is draped over the pouch and makes contact with the tree. In operation, lateral inward movement of the shaking device compresses the lubricant pouch against the interior of the contact blanket. The pouch is packed sufficiently tightly with lubricant to resist deformation as a result of this compression. However, the pouch accommodates deformation in the direction transverse to the axis of vibration, thereby absorbing transverse movement and preventing its transmission to the tree. The contact blanket frictionally engages both the pouch and the tree, adding further resistance to slippage against (and consequent injury to) the tree.

24 Claims, 2 Drawing Sheets

COMPLIANT ENGAGEMENT MEMBER FOR USE WITH TREE-SHAKING APPARATUS

BACKGROUND OF THE INVENTION

1. Field of the Invention

The present invention relates to fruit- and nut-harvesting equipment, and more particularly to a compliant engagement member for use with the heads of tree-shaking apparatus.

2. Description of the Related Art

Mechanical devices for harvesting fruit and nuts from trees typically operate by gripping the tree trunk and imparting thereto a controlled, low-frequency vibration or shaking action. This operation dislodges the fruit or nuts, which are then collected and transported.

A typical tree-shaking apparatus includes two opposing clamp members that engage the tree trunk, and which are themselves driven by dual oscillation units. These units coact to rock the tree laterally. In older devices, the clamps were provided with simple pads that would make direct contact with the tree. This approach, unfortunately, resulted in frequent injury to the tree due to abrasion.

To reduce the abrasive effect of pad contact, equipment manufacturers have experimented with various types of deformable engagement pads, such as those described in U.S. Pat. No. 3,318,629. Deformable pads were, for example, filled with a loose packing of granular material, and could therefore fit snugly around a variety of irregularly shaped trees or limbs without excessive local pressures. This type of configuration, while less harmful to the trees, is far less efficient at transmitting vibration than non-deformable pads, since the loosely packed material inherently absorbs vibratory force before it reaches the tree.

Current tree-shaking devices often utilize non-deformable shaker pads that contain associated lubrication arrangements; these avoid tree damage through deliberate slippage within the devices rather than against the trees. An example of this approach appears in U.S. Pat. No. 4,921,073, which describes a shaking head that includes a main shaker pad, a sling that surrounds the pad, and a slip pad that overlies the sling and makes contact on its outer face with the tree. A heat-resistant lubricant or grease is applied between the sling and the slip pad, ensuring that vibration causes the sling to slide across the inner face of the slip pad, while the outer face of the slip pad remains stationary with respect to the tree and therefore does not abrade the bark.

Although externally lubricated arrangements such as this avoid tree damage while preserving adequate transmission of vibration from the oscillation units to the tree, they require cumbersome manual or mechanical systems that replenish the lubricant as it is squeezed out from between the padding layers during operation. Like any forced-fluid device, these mechanical systems require maintenance and are vulnerable, particularly in the vigorous operating environment of a tree-shaking device, to malfunction. Furthermore, because spent lubricant is ejected or falls to the ground during operation, the possibility of environmental contamination must also be considered and prevented.

DESCRIPTION OF THE INVENTION

Objects of the Invention

Accordingly, it is an object of the present invention to provide a compliant shaking pad that avoids tree damage without the need for free lubricant.

It is a further object of the invention to provide a compliant shaking pad that requires limited or no maintenance.

It is another object of the invention to avoid environmental contamination and expense associated with ejection of lubricant from tree-shaking pads.

Other objects will, in part, be obvious and will, in part, appear hereinafter.

The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

Brief Summary of the Invention

The present invention provides a compliant engagement member for use with tree-shaking apparatus that resists deformation along the axis of vibration, thereby avoiding dissipation of vibrational energy, yet allows sufficient off-axis deformation to prevent slippage against the tree and consequent abrasion. The engagement member of the present invention preferably includes a rigid shaker pad; a sling that retains the shaker pad against the arm of a shaking device; a sealed, lubricant-filled pouch, depending from the sling; and a contact blanket, which is draped over the pouch and makes contact with the tree.

In operation, lateral inward movement of the shaking device compresses the lubricant pouch against the interior of the contact blanket. The pouch is packed sufficiently tightly with lubricant to resist deformation as a result of this compression. However, the lubricant and structure of the pouch allow it to accommodate deformation transverse to the axis of vibration, thereby absorbing this transverse movement and preventing its transmission to the tree. The contact blanket frictionally engages both the pouch and the tree, adding further resistance to slippage against (and consequent injury to) the tree.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
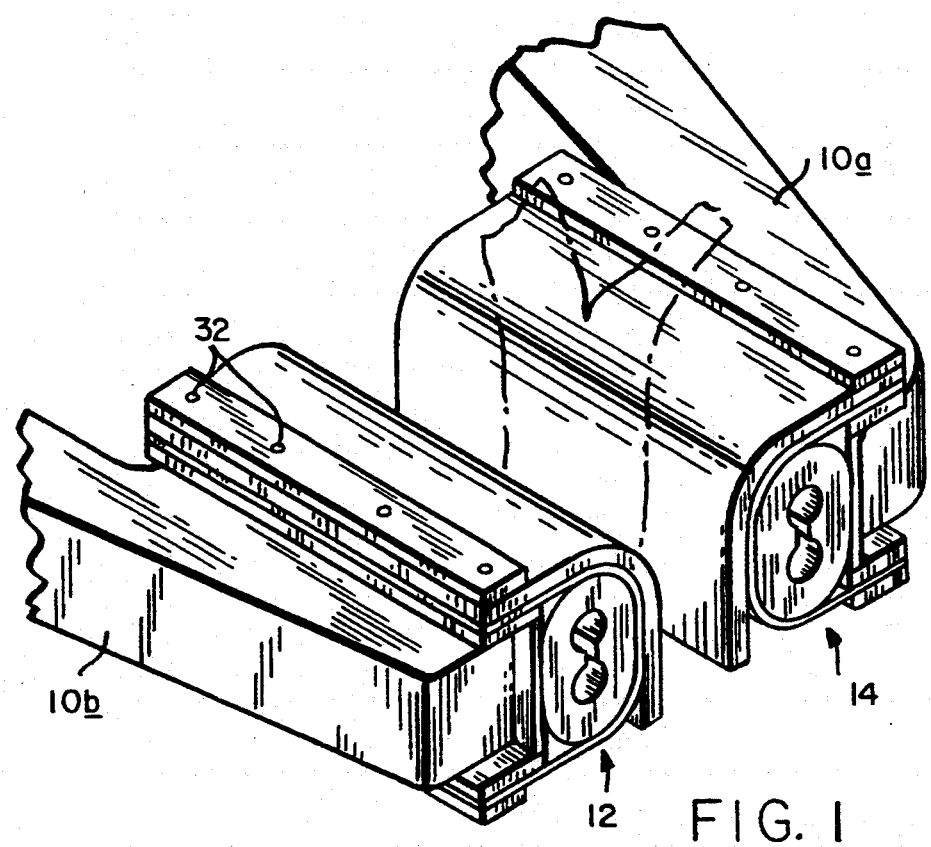
FIG. 1 is an isometric view of two compliant engagement pads in accordance with the present invention, situated on the projecting arms of a representative tree-shaking device.

Refer first to FIG. 1, which shows a pair of arms 10a, 10b that extend from the oscillation units of a conventional tree-shaking apparatus (such as one of those described, for example, U.S. Pat. Nos. 4,921,073 and 3,338,040, the entire disclosures of which are hereby incorporated by reference). The arms terminate in engagement assemblies 12, 14, which embody the present invention and are described in detail below. These members engage opposite (or nearly so) sides of a tree, shown in phantom, and transmit vibrations that shake the tree from side to side.

Figure 2:
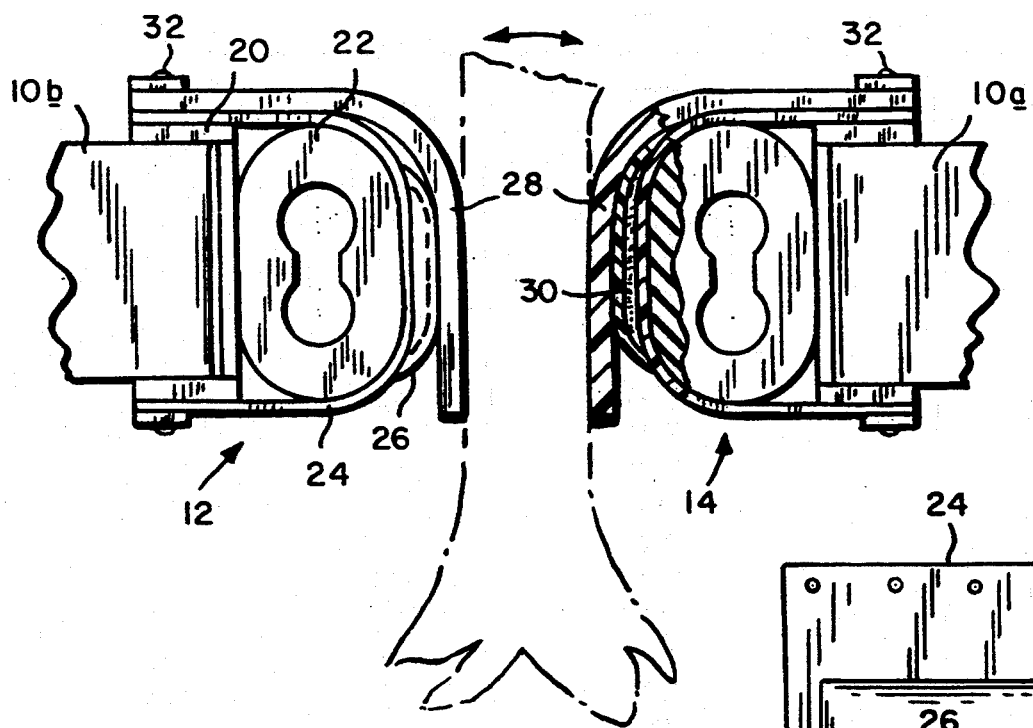
FIG. 2 is a partial cutaway end view of the arrangement shown in FIG. 1.

The details of the present invention are shown with greater particularity in FIG. 2. With reference to the assembly 12 depicted on the left, shaker arm 10b is received within a sturdy, preferably metal channel 20. A hollowed-out main pad 22, of generally ovoid or cylindrical shape, is braced against the outer wall of channel 20 by a retaining sling 24, which is fastened to channel 20 by bolts indicated generally by reference numeral 32; these can also extend through and retain shaker arm 10b. Extending from sling 24 is a sealed, lubricant-containing pouch 26, the outer face of which rests against the inner face of a blanket 28. Lubricant 30, shown in the cutaway portion of FIG. 2, is discussed in greater detail below.

During operation, shaker arms 10a, 10b deliver generally lateral impulses as shown by the arrow. However, even if the movement of engagement assemblies 12, 14 were absolutely perpendicular to the tree, a rigid head would nonetheless slip vertically against and thereby abrade the tree bark due to bending of the tree itself. Furthermore, in practice the movements of the shaker arms are never perfectly lateral; instead, they are to some extent skewed up or down relative to the axis of intended motion.

Figure 4:
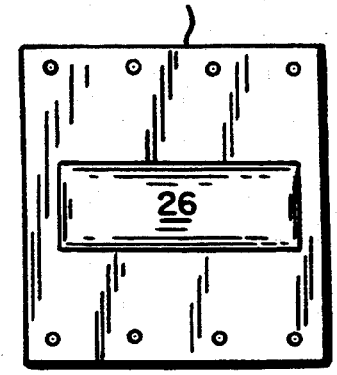
FIG. 4 shows the blanket and pouch dissociated from the remaining elements of the invention.
Figure 3:
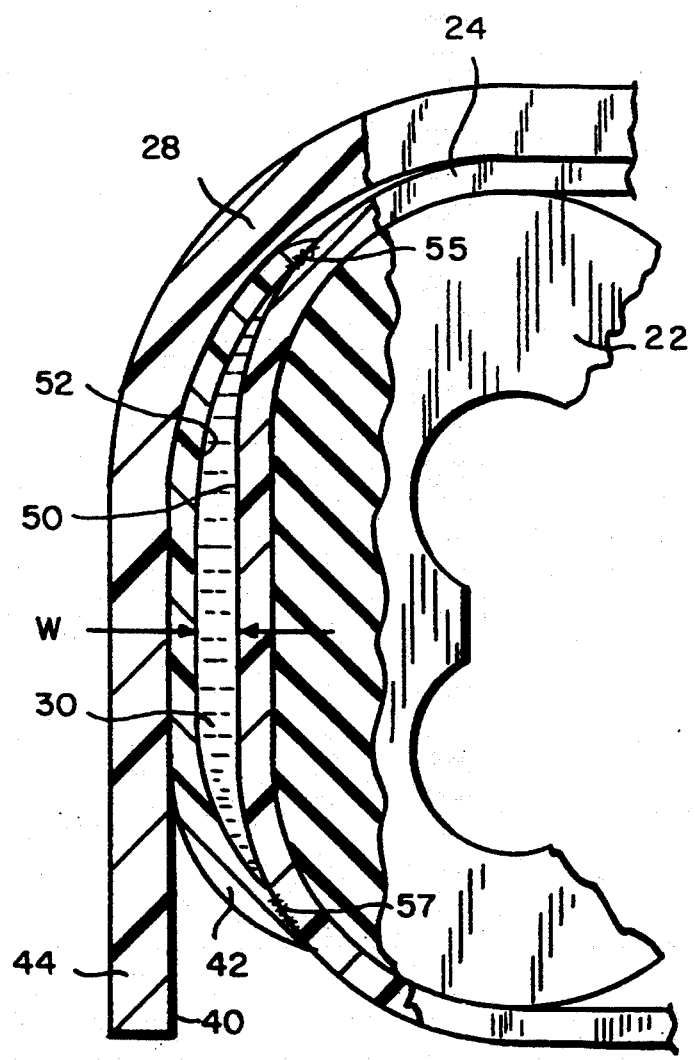
FIG. 3 is an enlarged detail of the cutaway section shown in FIG. 2.

The manner in which these off-axis movements are accommodated by the present invention without significantly dissipating vibrational energy can best be understood with reference to FIG. 4, which shows the cutaway portion of FIG. 2 in greater detail. Lubricant 30 is packed tightly within pouch 26, which is preferably flexible and resistant to pronounced deformation (i.e., bulging) as a result of vibration, so that lateral movement of pad 22, which is itself massive and rigid, is transmitted efficiently to blanket 28 instead of being absorbed. At the same time, pouch 26 can accommodate a relatively modest deformation transverse to the axis of intended motion; this is due to any of a variety of construction considerations, including inherent elasticity, slight looseness in lubricant packing, and pouch form that tapers toward the seams 55, 57, thereby discouraging lubricant from gathering at those seams. The degree of allowed transverse deformation preferably matches either the average off-axis vibration amplitude of the oscillation unit or the degree of off-axis movement caused by bending of a tree during operation. Because this degree of deformation is small, little vibrational energy is lost.

The inner face 40 of blanket 28 frictionally engages the outer face 42 of pouch 26 to ensure that the pouch deforms, rather than slips, as a result of small off-axis movement. Furthermore, the outer face 44 of blanket 28 should frictionally engage the tree; although the pressures at which the engagement assemblies are held against the tree promote strong frictional engagement between pouch 26 and blanket 28, good frictional contact with the tree will prevent tugging of the pouch against the inner face of the blanket from dragging the blanket along the tree.

To promote the foregoing mode of operation, the curvature of the pouch preferably conforms to that of pad 22, and the width w of the pouch is preferably small relative to the height of pad 22. Indeed, with a sufficiently slippery and thermal stress-resistant lubricant, the outer wall 50 of sling 24 can very nearly meet the inner wall 52 of pouch 26. Alternatively or in addition, walls 50 and 52 can be fabricated from materials having very low coefficients of friction, such as "TEFLON" or polymers incorporating "TEFLON", or the "KALREZ" polymer sold by E.I. dupont de Nemours & Co., Wilmington, Del.; these materials can be allowed to rub against one another directly or with the aid of a minimal amount of lubricant.

Suitable lubricants may be liquid, such as oil or soap, which are most useful when the width of pouch 26 is small. At larger widths, more viscous materials, such as silicone, or dry lubricants such as graphite are preferred.

The construction of sling 24 and pouch 26 is shown in FIG. 4. Both of these components, as well as pad 22 and blanket 28, are made of a sturdy elastic material such as vulcanized rubber. Sling 24 is manufactured in the form of a compliant sheet that wraps around pad 22, preferably stretching slightly when mounted to retain pad 22 securely. As previously noted, pad 22 is sufficiently sturdy to behave as a solid, undeformable object during operation. Because of the stresses that pouch 26 encounters, it is preferably molded as an integral excrescence from sling 24. Pouch 24 can also be fabricated to exhibit different levels of hardness at different points to accommodate wear. For example, continued operation may result in settling of the lubricant toward the lower portion of pouch 24; to ensure that lubricant continues properly to rise with upward deformation, the lower portion of pouch 24 can be made harder than the upper portion, thereby discouraging pouch 24 from sagging and allowing lubricant to accumulate at the bottom.

Variations on the foregoing design are possible. For example, pouch 26 can extend directly and integrally from pad 22. Blanket 28, although shown fastened only at one end to channel 20, can instead wrap around sling 24 and pouch 26 in the manner that the latter wraps around pad 22.

It will therefore be seen that the foregoing represents a highly advantageous design for tree-shaker engagement members. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A compliant engagement member for use with tree-shaking apparatus, the member comprising:
   a. a shaker pad;
   b. extending from the shaker pad a curved, sealed pouch containing a lubricant, the pouch being resistant to deformation along a first dimension but accommodating movement along a second dimension; and
   c. means for coupling the shaker pad to the tree-shaking apparatus.

2. The engagement member of claim 1 further comprising a blanket overlying and frictionally engaging the pouch, and wherein the pouch extends integrally from a sling that surrounds at least part of the shaker pad.

3. The engagement member of 2 wherein the pad, pouch and sling are all made of rubber.

4. The engagement member of claim 1 wherein the lubricant is a viscous liquid.

5. The engagement member of claim 1 wherein the lubricant is a solid powder.

6. The engagement member of claim 1 wherein the lubricant is silicone.

7. The engagement member of claim 2 further comprising means for receiving a vibration unit, said means being secured to the sling, which holds the shaker pad fixedly against said means.

8. The engagement member of claim 1 wherein the volume of the pouch is relatively small relative to that of the pad.

9. The engagement member of claim 1 wherein the curvature of the pouch substantially matches that of the pad.

10. The engagement member of claim 1 wherein the pouch is elastic.

11. The engagement member of claim 10 wherein the pouch varies in hardness.

12. A compliant engagement member for use with tree-shaking apparatus, the member comprising:
   a. a curved, rigid shaker pad;
   b. extending from the shaker pad a sealed pouch containing a lubricant and having front and rear walls, the rear wall having a curvature that substantially matches the curve of the pad and the front wall being tapered in two directions to the curve of the rear wall; and
   c. means for coupling the shaker pad to the tree-shaking apparatus.

13. The engagement member of claim 12 further comprising a blanket overlying and frictionally engaging the pouch, and wherein the pouch extends integrally from a sling that surrounds at least part of the shaker pad.

14. The engagement member of claim 13 wherein the pad, pouch and sling are all made of rubber.

15. The engagement member of claim 12 wherein the lubricant is a viscous liquid.

16. The engagement member of claim 12 wherein the lubricant is a solid powder.

17. The engagement member of claim 12 wherein the lubricant is silicone.

18. The engagement member of claim 12 wherein the pouch includes two interior walls and the lubricant is contained within the walls.

19. The engagement member of claim 13 further comprising means for receiving a vibration unit, said means being secured to the sling, which holds the shaker pad fixedly against said means.

20. The engagement member of claim 12 wherein the volume of the pouch is relatively small relative to that of the pad.

21. The engagement member of claim 12 wherein the pouch is elastic.

22. The engagement member of claim 21 wherein the pouch varies in hardness.

23. A compliant engagement member for use with tree-shaking apparatus, the member comprising:
   a. a shaker pad;
   b. extending from the shaker pad a curved, sealed pouch containing a liquid lubricant; and
   c. means for coupling the shaker pad to the tree-shaking apparatus.

24. The engagement member of claim 23 further comprising a blanket overlying and frictionally engaging the pouch, and wherein the pouch extends integrally from a sling that surrounds at least part of the shaker pad.

* * * * *